(12) United States Patent
Gram

(10) Patent No.: US 7,361,011 B2
(45) Date of Patent: Apr. 22, 2008

(54) EJECTOR SYSTEM

(76) Inventor: Jes Tougaard Gram, Bishop Svanes Vej, 5, Birkerød (DK) 3460

(*) Notice: Subject to any disclaimer, the term of this patent is extended or adjusted under 35 U.S.C. 154(b) by 76 days.

(21) Appl. No.: 10/469,018

(22) PCT Filed: Feb. 25, 2002

(86) PCT No.: PCT/DK02/00125

§ 371 (c)(1),
(2), (4) Date: Aug. 26, 2003

(87) PCT Pub. No.: WO02/076702

PCT Pub. Date: Oct. 3, 2002

(65) Prior Publication Data

US 2004/0075195 A1   Apr. 22, 2004

(30) Foreign Application Priority Data

Feb. 26, 2001  (DK) .......................... 2001 00317

(51) Int. Cl.
*B29C 43/50* (2006.01)

(52) U.S. Cl. .................. 425/556; 425/351; 425/436 R

(58) Field of Classification Search ..... 264/297.2–297, 264/334, 310–312; 425/436 R, 418, 351, 425/345, 588, 581, 556
See application file for complete search history.

(56) References Cited

U.S. PATENT DOCUMENTS

| 2,052,061 | A | * | 8/1936 | Toelke ........................ 425/261 |
| 2,200,224 | A | * | 5/1940 | Brownstein ................. 425/360 |
| 2,656,797 | A | * | 10/1953 | Chambon .................... 425/96 |
| 2,733,488 | A | * | 2/1956 | Valyi .......................... 164/165 |
| 3,767,352 | A | * | 10/1973 | Rees ........................... 425/441 |
| 4,243,362 | A | * | 1/1981 | Rees et al. .................. 425/130 |
| 4,439,133 | A | * | 3/1984 | Rees et al. .................. 425/556 |
| 4,781,571 | A |   | 11/1988 | Heindl et al. |
| 4,822,553 | A | * | 4/1989 | Marshall ..................... 264/292 |
| 6,099,769 | A | * | 8/2000 | Koch .......................... 264/51 |
| 6,386,849 | B1 | * | 5/2002 | Kroeger et al. ............. 425/112 |
| 6,613,262 | B1 | * | 9/2003 | Arend ......................... 264/255 |

FOREIGN PATENT DOCUMENTS

| DE | 4218822 | 12/1993 |
| JP | 11-58465 | 3/1999 |
| SU | 1479303 | 5/1989 |

* cited by examiner

*Primary Examiner*—Jill L. Heitbrink
(74) *Attorney, Agent, or Firm*—Ladas & Parry LLP

(57) ABSTRACT

The invention concerns an ejector system, where the ejectors or the stripper plates (10) in the turnable tool part(s) (8) are being activated in turn after each turning and opening/closing cycle in the machinery by means of a stationary placed mechanism (11). This can perform a forward and backwards movement, and is situated outside the turnable mold part(s), but in such a way that the stationary placed forward and backwards going mechanism (11) enables the shifting activations of the ejector mechanism (10) on the different sides of the turnable mold part(s) in turn. The stationary placed forward and backwards going mechanism (11) can perform its movements by hydraulic, pneumatic, electric or other influence of e.g. a piston. The turnable mold parts of the tool suitably turn around axis, which are parallel and at a right angle on the opening/closing movement of the tool. At a right angle at this axis is each turnable mold part preferably designed with a cross section, which makes up a regular polygon, preferably a square.

7 Claims, 5 Drawing Sheets

Fig 1 - Prior Art

EJECTOR SYSTEM

The invention concerns a procedure for the ejection of objects placed on (a) turnable mold part(s) in a tool preferably for plastic parts as described in the introduction of claim 1 as well as a machinery for the exercise of the procedure.

There are known a series of different procedures for the molding of plastic objects and ejection hereof in a tool or mold, which is equipped with at least one turnable mold part. An example hereof is the in my international patent application No. WO 98/35808; described procedure and machinery for the production of two- or multi component objects of plastic. In this application is also mentioned a special ejector system in the turnable mold part, but working according to another principle than the one mentioned in this application.

In another of my international patent applications No. WO 00/73040 there is also shortly described the possibility to eject plastic objects in a turnable mold part in a tool simultaneous with molding other objects in the tool.

The hitherto described procedures and machinery for the molding/demolding of molded objects however have different disadvantages and flaws. These are attempted to be solved by the procedure and machinery according to this invention. Hereby are also obtained a series of advantages and simplifications of the hitherto known ejector systems, which will be able to reduce the cycle time considerably and consequently the price of the finished objects, as well as reduce the size of the turnable mold part(s) and consequently both the prize of the tool and the running hereof.

The invention is characterized by the fact, that the ejector systems of the turnable mold part(s) (8) is activated in turn(s) after each turning and/or opening/closing cycle in the apparatus by means of a movable ejector mechanism (11) placed on a part of the tool, which is not turnable with the turnable mold part(s) (8), but which enables the changing activations of the ejector mechanisms (10) of the different sides of the respective turnable mold part in turn.

The stationary situated forward- and backward mechanism can perform its movements by hydraulic, pneumatic, electric or other influence from e.g. a piston.

The turnable mold parts of the tool suitably turn around axis, which are parallel and at a right angle to the opening/closing movement of the tool. At a right angle to this axis each turnable mold part is preferably made with a cross section, which constitutes a regular polygon, preferably a square. This square can suitably have its corners cut of, so less opening is required of the mold to turn the middle section around. For the same reason there suitably can be placed two or more turnable mold parts side by side in the tool. Besides a square or an adjusted square the cross section can be built like a regular hexagon, octagon or another preferably regular polygon, where the two opposite sides are parallel to each other.

The different uses and advantages by the procedure and mechanism according to the invention is further mentioned under the description to the drawing, where FIG. 1 shows seen from above a tool with a known ejector system, FIG. 2 shows in perspective a frame section with two turnable mold parts before ejection, FIG. 3 shows the same after ejection, FIG. 4 shows the same as FIG. 2, but with an exposed ejector mechanism, FIG. 5 shows the same as FIG. 3, but with an exposed ejector mechanism, FIG. 6 shows the same as FIG. 4, but seen from above, FIG. 7 shows the same as FIG. 5 seen from above, FIG. 8 shows the same as FIG. 2 in a cross section in length, and FIG. 9 shows the same as FIG. 3 in a cross section in length.

In FIG. 1 is seen a traditional tool with a known kind of ejector. The tool consists in principle of a stationary tool part, which is not shown on the figure, and a movable tool part 1 containing the ejector mechanism. This consists of the ejectors 2 themselves, that can eject the objects from their cavities 3, and which is fastened between the two mold plates 4 and 5, which further are connected with an ejector pin 6, that is driven forwards and backwards of e.g. a hydraulic mechanism, which is not shown at the figure. As it will be seen this known example of an ejector system needs a long distance from the lower end of the ejector system up to the objects, which are to be ejected. Furthermore there must be calculated on at least the double distance to obtain space for a cylinder with a stroke length that is able to eject in the given length. From this it will be understood, that if e.g. four of this known example of an ejector system are placed opposite to another in a turnable mold part, such a mold part will be big and complicated, which will make the tool and the running hereof un-proportional expensive.

FIG. 2 shows a frame section 7 seen in perspective with two turnable mold parts 8, each with a square cross section, where there up to on each of the four sides of the mold parts 8 are placed finished molded objects 9, each shown here as a rectangular plate. Beneath these are seen an ejector plate 10; that not yet has been activated by the ejector mechanism 11. The two turnable mold parts 8 are turning around each their respective axle 12. As it will appear such a design can be made extremely compact, which enables that more than the two shown turnable mold parts 8 can be placed side by side in the frame section 7.

FIG. 3 shows the same frame section 7 with two turnable middle parts 8, but where the objects 9 in the two opposite placed outer sides just are ejected in a right angle to the opening/closing direction of the tool by means of the on the turnable mold parts placed respective ejector plates 10, which are activated of the ejector mechanism 11, that are placed on the stationary frame section 7.

On FIG. 4 are shown the same as in FIG. 2, but here the total ejector mechanism are exposed immediately before it is activated. Each of the ejector mechanisms is driven both at the top and at the bottom of an oil cylinder 13, each moving an ejection arm 14, as in turn is in grip with that ejection plate 10, which is to be activated.

FIG. 5 shows the same as FIG. 3 with the ejector mechanism exposed as in FIG. 4, yet here with the ejector system in its outermost position, whereby the objects 9 just have been thrown out of their respective cavities. It will here be remarked, that the hole 15 in the ejector arm 14 is so big, that the ejector arm 14 does not collide with its respective axle 12 in this outermost position.

FIG. 6 corresponds to FIG. 4, but where the frame section 7 here is seen from above. Hereof appears that each of the ejector arms 14 is equipped with a grip 16 shaped as a part of a circle, which is positioned in a corresponding underlying recess 17 in the turnable mold part 8.

In FIG. 7, which corresponds to FIG. 5, is the frame section 7 seen from above as in FIG. 6, but here is the ejector mechanism 11 in its outermost position, whereby the objects 9 on the side in question of the turnable mold part are ejected. Contrary to the in FIG. 6 shown it is seen, that the grip 16 is removed out from the circular recess 17 and thereby has activated the ejector plate 10.

Figure 1:
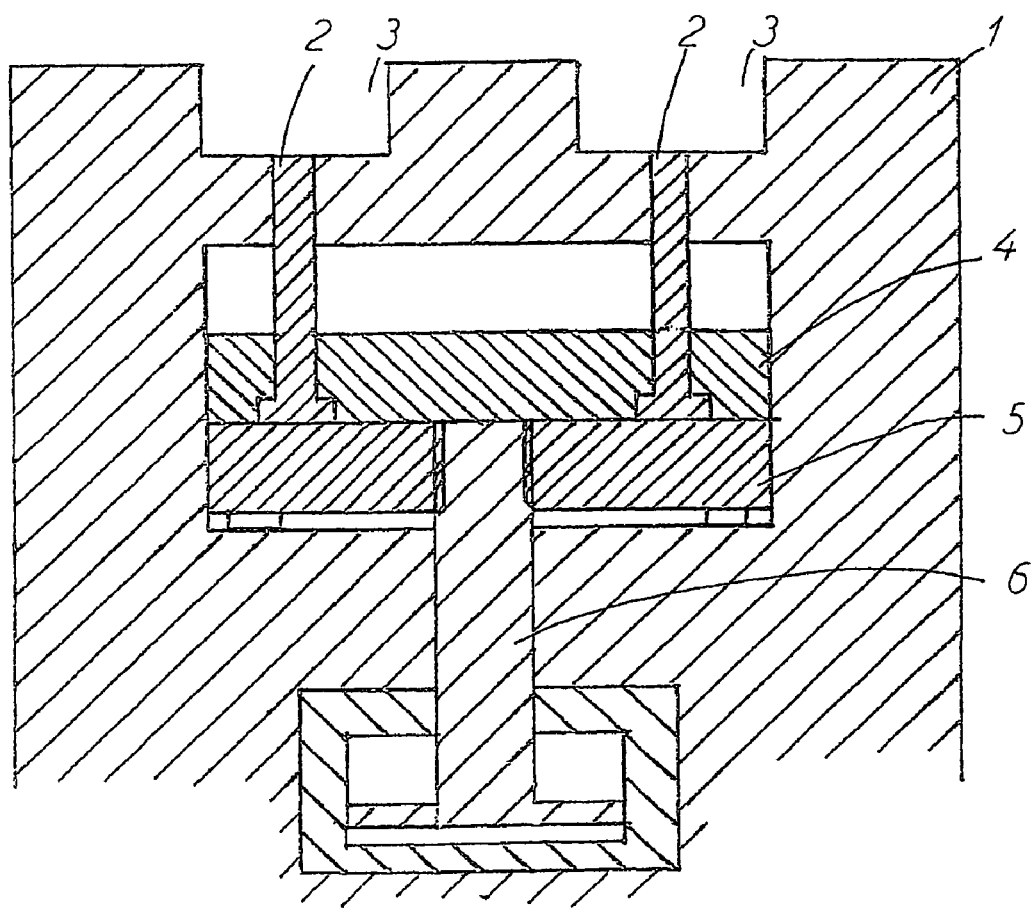
Figure 2:
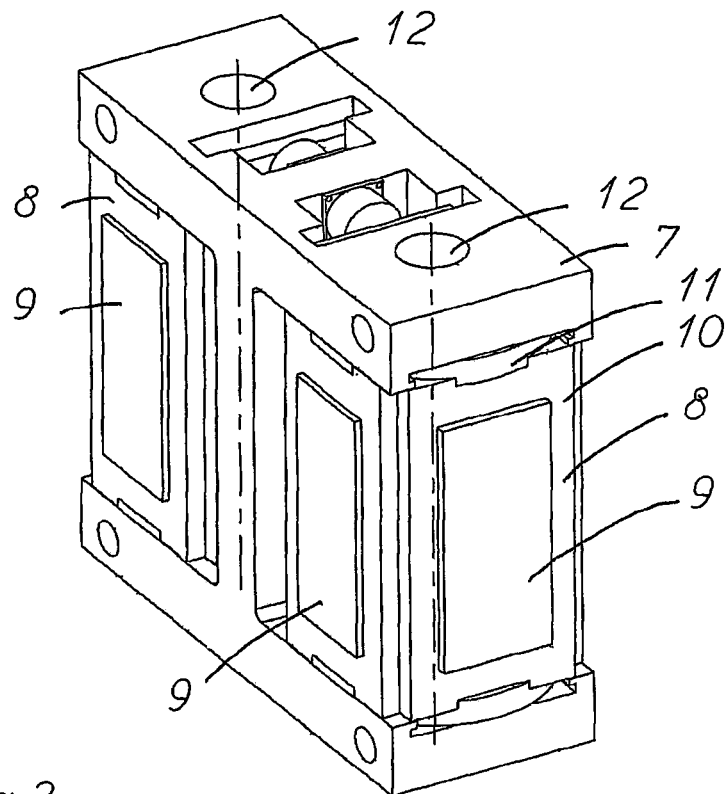
Figure 3:
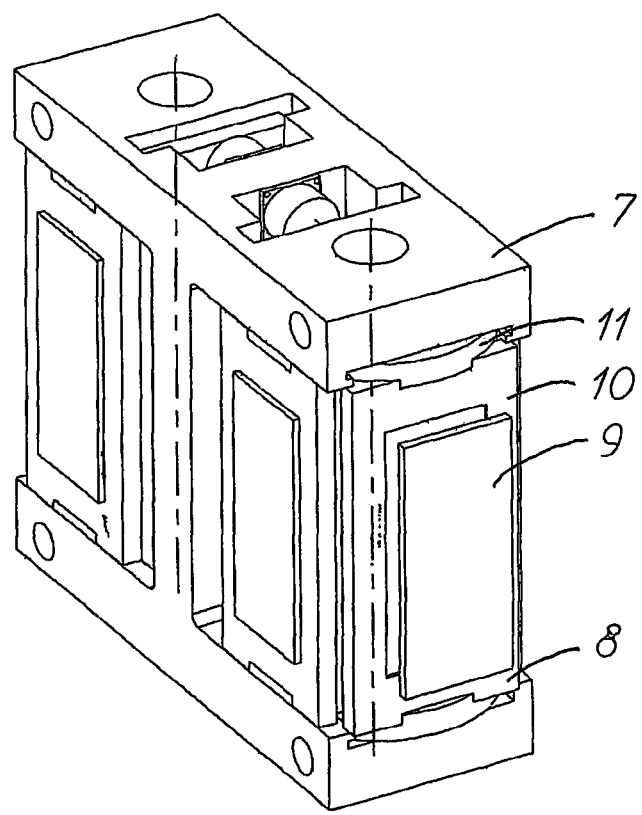
Figure 4:
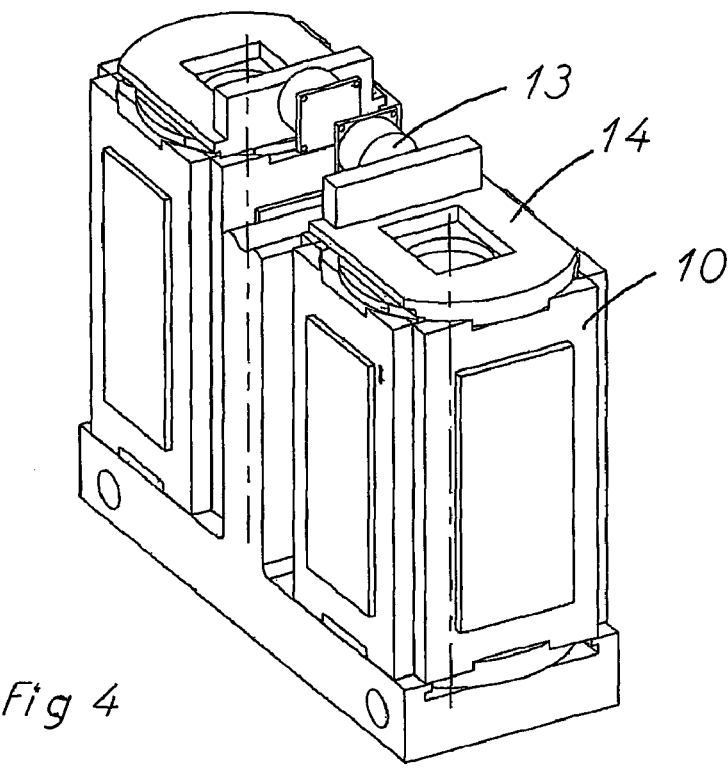
Figure 5:
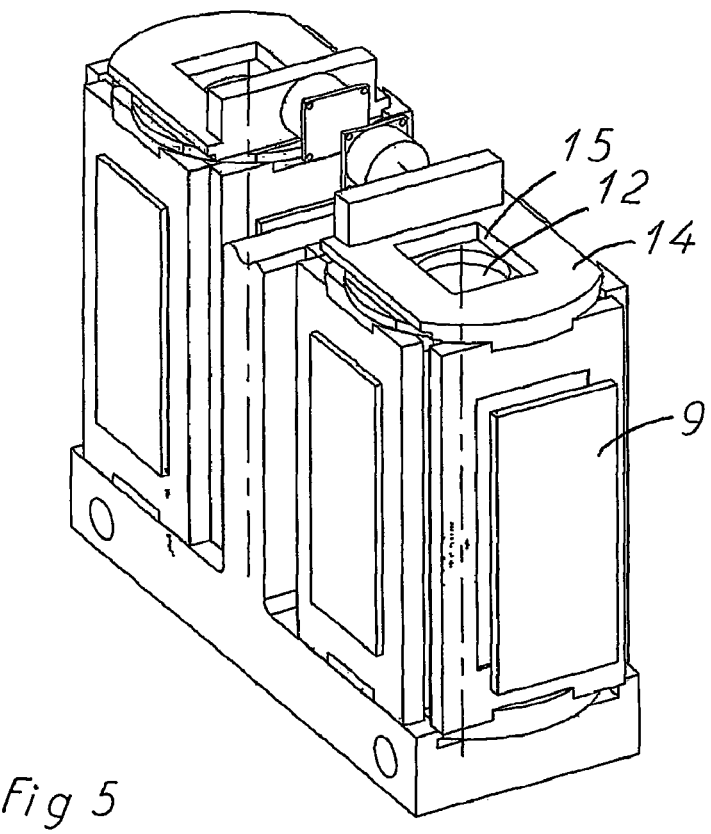
Figure 6:
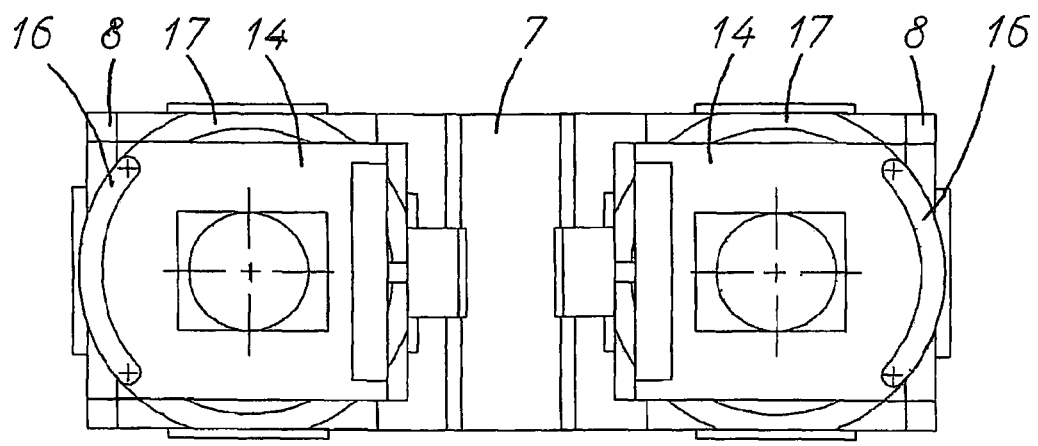
Figure 7:
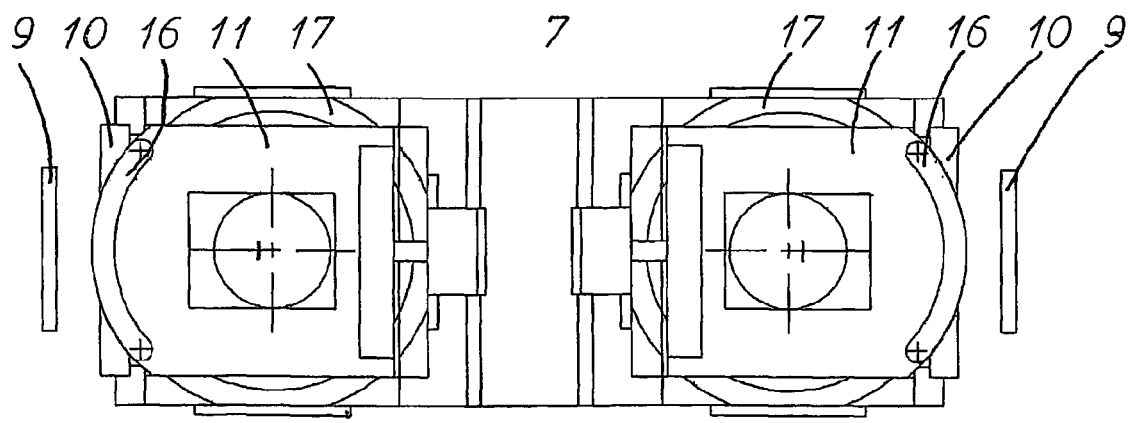
Figure 8:
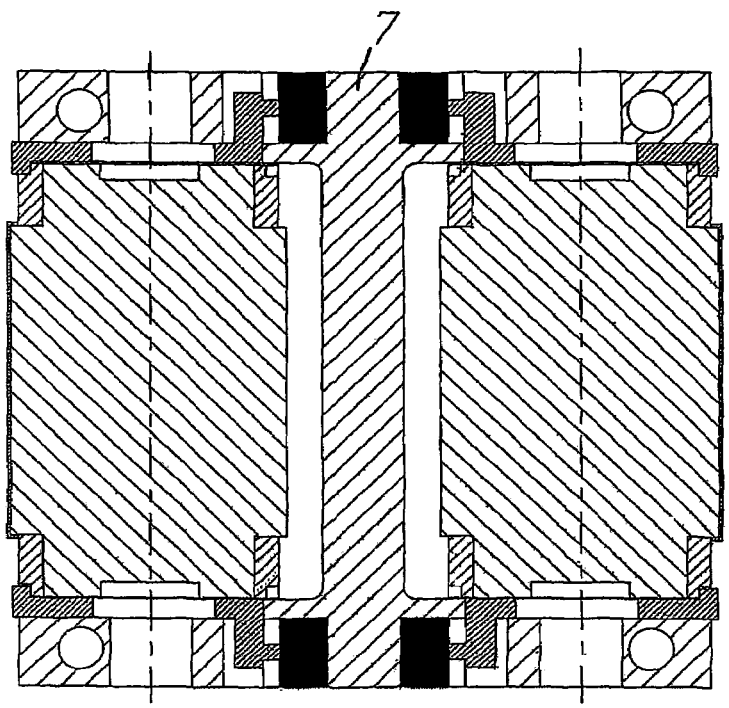
FIG. 8 shows seen from the side a cross section of the middle section 7, that corresponds to the in FIG. 2 shown.
Figure 9:
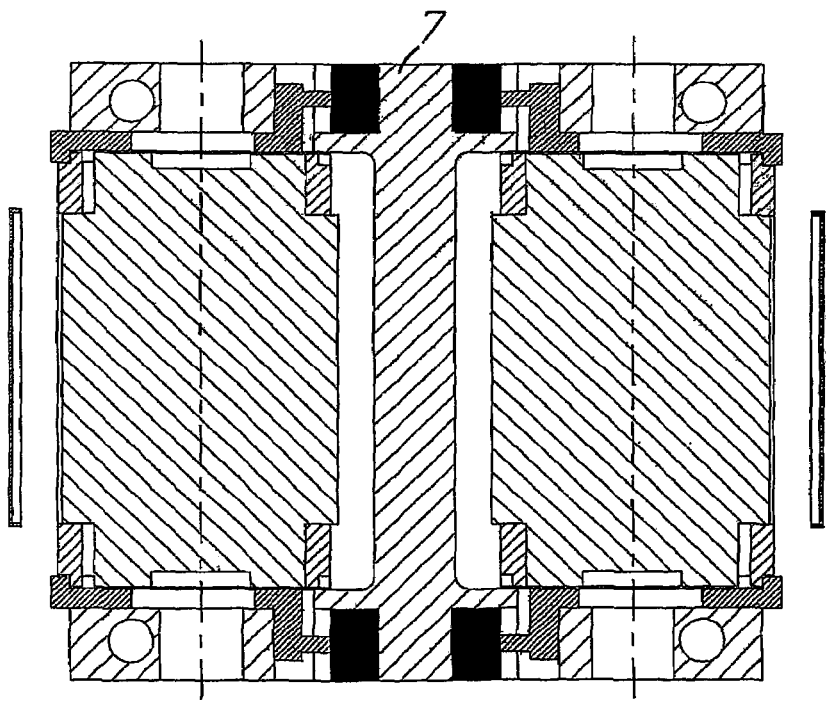
FIG. 9 shows seen from the side accordingly a cross section of the middle section 7, which corresponds to that in FIG. 3 shown.

The on the drawing shown is only an example of how this invention can be realized in working tools. A number of other embodiments can be thought of the ejector system according to the invention, but the shown should be sufficient to show the fundamental principles of the invention.

On the drawing are exclusively shown ejector systems in one-component molding molds, but the system is at least as applicable in two- or more-component molds.

Besides the shown embodiments of the ejector system there also could have been shown one or more examples on different ways where the ejectors in the ejector system can be designed to be able to demold special objects. Here is e.g. thought upon the common ejector pins, tube ejectors, as well as various combinations, where air or other kinds of help are used to obtain an optimal ejection of the objects from the turnable mold part in the tool. In a special version, that also is not shown on the drawing, there can be jaws in a stationary position, which enter and grasp around the objects and pull the objects off the turnable mold part and/or activates an ejector system in the turnable mold part. Hereby very complex and/or critical objects will be able to be handled further in a robot movement, and thereby enable automate of objects otherwise hardly possible to eject/demold in a traditional way.

Finally shall be mentioned an example of a horizontal and/or vertical turning table with an according to the invention integrated ejector system, which in many different tools can be used to activate and work the ejector system, which is prepared to use such an ejector system. This at the same time as the turnable mold part(s) in these tools could be monitored and turned by the driving unit in this turning table, which would give great savings in the tool costs, as you whether should have to built a turning unit or an ejector unit into the turnable mold parts.

Furthermore there can be imagined other ways to activate the ejector system according to the invention, e.g. by using the opening and closing movement to activate and work the ejector system according to the invention, possibly in combination with and/or through an activation and mechanical force driven turning of the turnable mold part(s).

The ejector system according to the invention is not limited to be able to eject objects on the side, as the system is functional in all directions from the turnable mold part, as long as the individual mold construction allows it, and not least gives room for this.

In light of the foregoing there is disclosed a procedure and an ejector system for ejecting molded parts from molds. The maids are referred to herein as "mold parts" and they are identified in the figures by reference numeral 8. As described above, parts are formed in the mold parts 8 by molding. As also described above, the molded parts are identified in the figures by reference numeral 9.

The molded parts 9 are ejected from the molds, i.e., the "mold parts 8" by an ejector system that is comprised of a frame 7, in which the mold parts 8 are mounted and by which they are able to turn together around an axle 12. As can be seen in the figures, each of the mold parts 8 faces outwardly and away from the axle 12. As the several mold parts 8 turn around the axle 12, in 90 degree steps or increments, the mold parts 8 come in front of an ejector mechanism by which the molded parts 9 are ejected from a corresponding mold part 8. As stated above, ejector mechanisms 11 are located at both the top and bottom of the mold parts 8.

The ejector mechanisms 11 that eject the molded parts 9 from the mold parts 8, are driven by ejection arms 14, which are in turn driven by oil cylinders 13. The frame 7 and mold parts 8 are configured so that the mold parts 8 can rotate around the axle 12. Each 90-degree rotation of the mold parts 8 about the axle 12, places a different one of the mold parts 8 in position for having its corresponding molded part 9, ejected by the ejector mechanism 11.

The invention claimed is:

1. An ejector comprised of:
   a frame, which holds a plurality of mold parts, each mold part being used for molding a work piece, the mold parts having cavities in which work pieces are molded, each mold part having a top and a bottom and being attached to and rotating with an axle having a center axis about which each axle and each corresponding mold part rotates
   within the frame, the mold parts being arranged so that that cavities of the mold parts face away from the axle;
   an ejector mechanism coupled to the frame and located substantially between the axle and at least one of the plurality of mold parts, the ejector mechanism being comprised of first and second ejection arms, which are sized, shaped and arranged to move transversely relative to the axis of the axle, a rotation of the mold parts around the axle by ninety degrees positions a first mold part in a first position whereat a work piece in said first mold part can be ejected after a second mold part is closed to form a second work piece in said second mold part, whereat transverse motion of the ejection arms toward the first mold part causes the first work piece in the first mold part to be ejected from the first mold part's cavity, said first and second ejection arms acting at the top and bottom of the second mold part; and
   wherein a second work piece to be molded in a second mold part is ejected from the second mold part after the first work piece is ejected from the first mold part; and
   wherein subsequent rotations of the mold parts by ninety degree increments about the axis locates one of them into said first position and another of them into said second position.

2. The ejector of claim 1 wherein the mold parts are substantially rectangular.

3. The ejector of claim 1 wherein the frame holds at least four mold parts.

4. The ejector of claim 1 wherein the axle is oriented vertically.

5. The ejector of claim 3 wherein the axle is oriented vertically.

6. The ejector of claim 1 wherein a 90 degree rotation of the mold parts around the axle, places a different mold part in position whereat transverse motion of the ejection arms toward the mold part causes a work piece in the mold part to be ejected there from.

7. The ejector of claim 4 wherein each 90 degree rotation of the mold parts around the vertical axle, places a different mold part in position whereat transverse motion of the ejection arms toward the mold part causes a work piece in the mold part to be ejected there from.

* * * * *